UNITED STATES PATENT OFFICE.

HAROLD VON BRAMER, OF ROCHESTER, NEW YORK, ASSIGNOR TO EASTMAN KODAK COMPANY, OF ROCHESTER, NEW YORK, A CORPORATION OF NEW YORK.

PROCESS OF MAKING HYDROCHINON.

1,421,869.   Specification of Letters Patent.   Patented July 4, 1922.

No Drawing.   Application filed June 28, 1920. Serial No. 392,417.

*To all whom it may concern:*

Be it known that I, HAROLD VON BRAMER, a citizen of the United States of America, residing at Rochester, in the county of Monroe and State of New York, have invented certain new and useful Improvements in Processes of Making Hydrochinon, of which the following is a full, clear, and exact specification.

This invention relates to the manufacture of hydrochinon and to the steps used in such process.

One object of the invention is to produce hydrochinon as inexpensively as possible from materials of small cost by means of steps which will give large yields. Other objects will hereinafter appear.

I have discovered that a paradihalogenbenzol, preferably paradichlorbenzol, may be converted into hydrochinon by first sulfonating it and then re-acting on the sulfonated product to replace both halogen atoms with hydroxyl groups and to eliminate the sulfonating group. The sulfonation of the paradihalogenbenzol makes the halogen atoms susceptible to the action of bodies containing strongly re-active hydroxyl groups, such as the hydroxids of the alkali metals. In applying my discovery I have worked out useful auxiliary steps which facilitate the carrying out of my process on a commercial scale.

Since paradichlorbenzol is a relatively inexpensive by-product of certain chemical processes, I shall give a detailed working example of my method as applied to it. But it is to be understood that my invention is not limited to these illustrative details. The first step is the sulfonating operation. While stirring vigorously and maintaining a temperature of from 130° to 140° C., I re-act on 100 parts of paradichlorbenzol with 200 parts of commercial oleum. A purer fuming sulfuric acid may be used for this sulfonation, but I prefer the commercial grade. The sulfonating re-action is often completed in about three-quarters of an hour. The result is considered to be the replacement of one of the hydrogens of the paradichlorbenzol with a $SO_3H$ group.

The solution is next poured into 300 parts of ice cold water. If the sulfonation is not completed, any unchanged paradichlorbenzol can be distilled out with steam, although the sulfonation is usually complete enough to make this distillation unnecessary. To the solution is now added 75 parts of sodium chloride. A double decomposition takes place, sodium paradichlorbenzolsulfonate being precipitated, and free hydrochloric acid remaining in the solution. To insure completion of the re-action, the solution may be stirred for say an hour. The precipitated sodium salt is filtered off, a suction filter being convenient. I find that the yield is nearly quantitative.

The sodium paradichlorbenzolsulfonate obtained by the preceding steps (when further purified if desired, although this is not usually necessary) is next converted into a hydrochinon body by treatment with an aqueous solution of a strong base. The sodium paradichlorbenzolsulfonate obtained, as above explained, from the sulfonation of 100 parts of paradichlorbenzol is re-acted upon with 150 parts of caustic soda in 225 parts of water. The mixture is put in any suitable apparatus for heating under pressure, a convenient one being an autoclave which can be made of either iron, copper, bronze, or other suitable metals. After thorough mixing, the autoclave is sealed and the heating operation performed until the sodium paradichlorbenzolsulfonate changes into the sodium salt of hydrochinon. I find that stirring facilitates the conversion. Temperatures of from 175° to 200° C. are preferable, a yield of about half of the theoretical amount of the hydrochinon body being obtained if these temperatures are maintained for twenty-four hours. The pressure in the autoclave, of course, varies automatically with the temperature used.

After cooling, the solution is taken from the autoclave and the remaining alkali is neutralized with any suitable acid, say hydrochloric, the latter being added until the solution is slightly acid. Sodium sulfite is formed in the re-action and one convenient way of determining the proper degree of acidification is to note when the odor of sulfur dioxide is apparent. After boiling for a few minutes, the solution is then cooled and the hydrochinon extracted with ether or any other suitable solvent in the well known way. The solvent finally is distilled leaving the hydrochinon which can be further purified by known methods, if desired.

Having thus described my invention, what I claim as new and desire to secure by Letters Patent is:

1. In the process of converting a paradihalogenbenzol into hydrochinon, the steps of treating the paradihalogenbenzol with a sulfonating agent to replace a hydrogen in the paradihalogenbenzol with a sulfonating group and re-acting on the paradihalogenbenzol sulfonated compound thus produced with an agent furnishing strongly re-active hydroxyl groups to replace both halogens of such paradihalogenbenzolsulfonated compound with hydroxyl groups and to remove the sulfonating group.

2. In the process of making hydrochinon, the steps of sulfonating paradichlorbenzol and re-acting on the product thus obtained with an agent supplying strongly re-active hydroxyl groups to convert said product into a hydrochinon body.

3. In the process of making hydrochinon, the steps of acting on paradichlorbenzol with a sulfonating agent until paradichlorbenzolsulfonate is produced, treating the latter with the salt of an alkali metal until paradichlorbenzolsulfonate of said metal is produced, and re-acting on the latter with the hydroxid of an alkali metal to produce a hydrochinon body.

4. In the process of making hydrochinon, the steps of reacting on paradichlorbenzol with oleum at 130° to 140° C. with vigorous stirring until paradichlorbenzolsulfonate is produced, adding sodium choride to the solution to precipitae sodiumdichlorbenzolsulfonate, separating the latter, mixing it with a solution of caustic soda, heating the mixture under pressure at a temperature of from 175° to 200° C. to produce the sodium salt of hydrochinon.

5. In the process of making hydrochinon, the steps of reacting on paradichlorbenzol with oleum at 130° to 140° C. with vigorous stirring until paradichlorbenzol sulfonate is produced, adding sodium chloride to the solution to precipitate sodiumdichlorbenzolsulfonate, separating the latter, mixing it with a solution of caustic soda, heating the mixture under pressure at a temperature of from 175° to 200° C. to produce the sodium salt of hydrochinon, acidifying the solution, boiling, cooling, and then extracting the hydrochinon with a suitable solvent.

6. In the process of making hydrochinon, the step of reacting on a paradihalogenbenzolsulfonate with a metallic hydroxid until the hydrochinon salt of said metal is produced, and recovering hydrochinon from the reaction mixture.

7. In the process of making hydrochinon, the step of reacting on the paradichlorbenzolsulfonate of an alkali metal with the hydroxid of an alkali metal until the hydrochinon salt of said metal is produced.

8. In the process of making hydrochinon, the step of reacting on sodium paradichlorbenzolsulfonate with a solution of caustic soda under pressure at a temperature from 175° to 200° C., until the sodium salt of hydrochinon is produced.

9. In the process of making hydrochinon, the step of reacting on 100 parts of sodium paradichlorbenzolsulfonate with 150 parts of caustic soda in 225 parts of water under pressure at a temperature from 175° to 200° C., until sodium salt of hydrochinon is produced.

10. In the process of making hydrochinon, the step of reacting on sodium paradichlorbenzolsulfonate with a solution of caustic soda under pressure at a temperature from 175° to 200° C., for approximately twenty-four hours.

11. In the process of making hydrochinon, the step of reacting on the paradichlorbenzolsulfonate of an alkali metal with the hydroxid of an alkali metal until the hydrochinon salt of said metal is produced, freeing the hydrochinon with an acid, and extracting the hydrochinon with a solvent thereof.

12. In the process of making hydrochinon, the step of reacting on sodium paradichlorbenzolsulfonate with a solution of caustic soda under pressure at a temperature from 175° to 200° C., until the sodium salt of hydrochinon is produced, acidifying the solution, boiling, cooling, and then extracting the hydrochinon with ether.

Signed at Rochester, New York, this 23rd day of June, 1920.

HAROLD VON BRAMER.